No. 876,154. PATENTED JAN. 7, 1908.
G. DUMOND.
SHOCK DEADENER FOR VEHICLES.
APPLICATION FILED JULY 30, 1906.
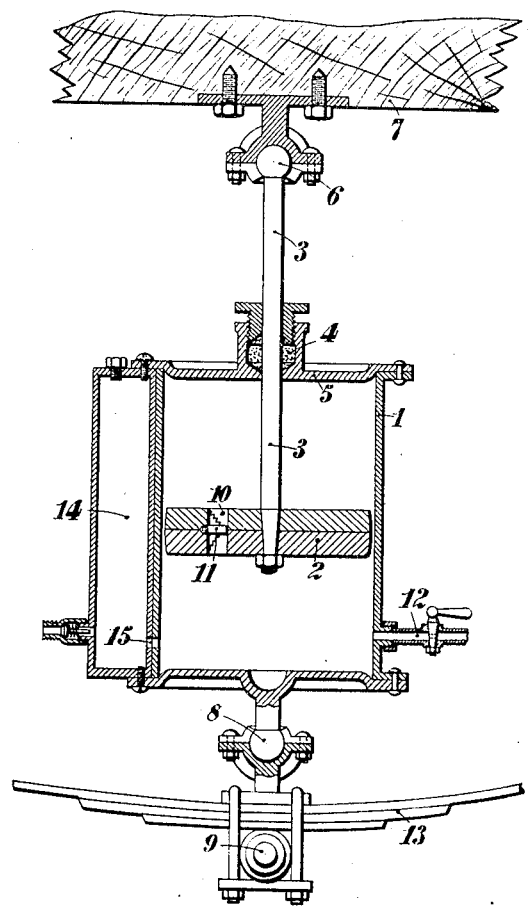
Witnesses:
Inventor
Gaston Dumond
By
James L. Norris
Atty.

UNITED STATES PATENT OFFICE.

GASTON DUMOND, OF PARIS, FRANCE.

SHOCK-DEADENER FOR VEHICLES.

No. 876,154.  Specification of Letters Patent.  Patented Jan. 7, 1908.

Application filed July 30, 1906. Serial No. 328,465.

*To all whom it may concern:*

Be it known that I, GASTON DUMOND, engineer, citizen of the French Republic, residing at Paris, Department of the Seine, France, and having post-office address 40 Rue de Villejust, in the said city, have invented certain new and useful Improvements in Shock-Deadeners for Vehicles, of which the following is a specification.

The invention has for its object a device for deadening shocks and re-actions for vehicles of all kinds, whether for mechanical or animal traction, or even for fixed installations. This shock-absorbing device is attached, on the one hand to the frame, and on the other to the axle, either directly or by the intermediary of the spring. It is jointed both to the frame and to the axle.

I will describe my said invention with reference to the accompanying drawing which is a longitudinal section of the apparatus.

The device when applied to a vehicle is constituted by a cylinder 1 in which there is mounted a piston 2 the rod 3 of which passes through a stuffing box 4 mounted in the upper end of the cylinder. The extremity of the piston rod is connected by a joint 6 to the frame 7 and the lower end of the cylinder is connected by a joint 8 to the axle 9 of the vehicle. The object of these joints which for example may be ball and socket joints is to permit the piston to work in the cylinder notwithstanding the displacement of the frame relatively to the axle.

The piston 2 is able to move with slight friction or even with a little play in the cylinder 1. In order to prevent binding and by this means permit of perfect adjustment of the apparatus, the bearing surface of the piston is given an arched form, by which means the points of contact with the cylinder are reduced; in this connection the spherical form is the ideal form.

A piston with guiding means, such as slideways, rollers or the like, might equally well be employed.

The two extremities of the cylinder communicate one with the other, either by means of play existing between the piston and the cylinder, or by means of holes 10 formed in the piston or by grooves in the wall of the piston or of the cylinder. There may also be arranged on all or some of the communication orifices valves 11 permitting of regulating the passage of the fluid contained in the apparatus with a larger flow in the direction of the descent of the piston.

The fluid contained in the apparatus is to be a liquid and it may be introduced by unscrewing the cylinder cover or through an inlet branch provided with a cock 12.

The apparatus having been filled, under the influence of a shock the piston will tend to descend in the cylinder. A portion of the fluid passes into the upper part of the cylinder, experiencing a certain resistance; when the re-action takes place, the piston tends to resume its original position under the influence of the spring 13, and the return of the fluid towards the lower part of the cylinder opposes a retarding resistance to this effect.

A pressure vessel 14 communicating with the lower part of the cylinder by means of a hole 15 might be added to the apparatus; when a shock occurs a portion of the fluid is then able to pass into this vessel, and after the shock the fluid contained in the vessel which would be in a state of compression would assist, owing to its expansion, in returning the apparatus into its position of repose. It should however be understood that this is a supplementary and not an obligatory addition. Another optional addition is the provision of a small chain fixed on the one hand to the frame and on the other hand to the piston rod in proximity to the ball and socket joint; this arrangement would prevent the system from falling in case of injury to the joint.

Having thus described and ascertained the nature of my invention and in what manner the same is to be performed, I declare that what I claim is:—

A double-acting shock absorber for vehicles comprising a closed cylinder containing a fluid and an arch-shaped piston of such diameter as to provide a space between it and the wall of the cylinder, thereby establishing communication between that portion of the cylinder above the piston and that portion below it, said piston further provided with a port, and a spring-controlled double-acting valve mounted in said port, said port further establishing communication between that portion of the cylinder above the piston and that portion below it.

In testimony whereof I have hereunto set my hand in presence of two subscribing witnesses.

GASTON DUMOND.

Witnesses:
  EMILE KLOTZ,
  MAUDE RIVAUD.